United States Patent [19]

Mishina

[11] Patent Number: 4,694,157
[45] Date of Patent: Sep. 15, 1987

[54] TEMPERATURE COMPENSATED ELECTRO-OPTICAL LIGHT TRANSMISSION CIRCUIT FOR USE IN A POSITION DETECTOR

[75] Inventor: Kazuhiro Mishina, Kadoma, Japan

[73] Assignee: Matsushita Electric Works, Ltd., Osaka, Japan

[21] Appl. No.: 752,339

[22] PCT Filed: Oct. 18, 1984

[86] PCT No.: PCT/JP84/00495
§ 371 Date: Jun. 19, 1985
§ 102(e) Date: Jun. 19, 1985

[87] PCT Pub. No.: WO86/02440
PCT Pub. Date: Apr. 24, 1986

[51] Int. Cl.$^4$ .............................................. H01J 40/14
[52] U.S. Cl. ..................... 250/214 C; 307/310; 307/311
[58] Field of Search ............... 250/214 R, 214 C, 206, 250/238, 231 SE, 221; 307/310, 311; 328/2, 3; 340/347 P

[56] References Cited

U.S. PATENT DOCUMENTS

| 3,670,325 | 6/1972 | Mathevosian | 250/214 C |
| 3,705,316 | 12/1972 | Burrous et al. | 307/311 |
| 4,327,362 | 4/1982 | Hoss | 250/231 SE |
| 4,438,348 | 3/1984 | Casper et al. | 328/2 |

Primary Examiner—Edward P. Westin
Attorney, Agent, or Firm—Armstrong, Nikaido, Marmelstein & Kubovcik

[57] ABSTRACT

The present invention provides an opto-electric position detector circuit utilized in encoders or the like which determine the position and speed of the motion of robots, processing machines, recorders or the like. The output from a photodetector is input to the Schmitt trigger circuit of which threshold voltage is derived from the output of a voltage dividing resistor circuit. The voltage dividing circuit is arranged in a series-parallel circuit configuration with a series combination of resistor and thermistor having negative temperature coefficient of resistivity which combination is in parallel relation to another resistor, such that the Schmitt trigger circuit provides a consistent rectangular waveform output over a wide temperature range to thereby assure exact control and measurements even in actual operating locations suffering from severe environmental conditions where temperatures are high. Also, the voltage dividing circuit is designed to derive its power from the output of a load resistance network associated with a light emitter such that the variations in the power supply voltage and therefor in the threshold voltage obtained therefrom can be well compensated in concordance with the output of the light emitter, which in addition to allowing a single circuit arrangement to be responsible both for the temperation and power supply voltage compensations, providing a consistent rectangular waveform output from the Schmitt trigger circuit over a wide range of possible variations in the power supply voltage.

2 Claims, 9 Drawing Figures

TEMPERATURE COMPENSATED ELECTRO-OPTICAL LIGHT TRANSMISSION CIRCUIT FOR USE IN A POSITION DETECTOR

TECHNICAL FIELD

The present invention is directed to an opto-electric position detector circuit, and more particularly to an opto-electric position detector circuit adapted for use in an encoder or the like which detects the position and speed for the purpose of measuring and controlling the motion of robots, processing machines, recorders or the like.

BACKGROUND ART

Generally, position detectors and angle detectors are classified into different systems according to the detecting means employed, opto-electric system utilizing light, magnetic system utilizing magnetism, and contact system utilizing resistance value. Taking an encoder as an example in order to provide an explanation, with the opto-electric system infra-red light emitted from a light emitter such as a light emitting diode (infra-red LED) is alternately permitted and interrupted to pass by the combination of a fixed plate (phase plate) with peripheral slits permitting the transmission of the light and a plate (code wheel) formed with like peripheral slits and rotating together on a shaft whose motion is to be measured. The resulting intermittent light passing through the plates is received by a photodetector such as a photo-diode which produces a varying electric current, such current variations are then utilized for detection of the position (angle) and the rotational speed of the shaft.

Also included in the above opto-electric system is a detector of linear type operating on the same principle as the above rotary type for detecting the position of a linear motion. Each of the above two types is further divided into transmissive and reflective types depending upon the relative position of the light emitter with the photodetector with respect to the code wheel and phase plate. In the reflective type, the code wheel or the phase plate has its portion mirror-finished and both the light emitter and photodetector are positioned on the same side of the code wheel or the phase plate.

Further, there are incremental and absolute types depending upon the kind of output signal obtained. For example, with the absolute type the output is in the form of a four-bit signal in order to determine the absolute positions (in such a case 16-divided).

The light received by the photodetector causes changes in the electric current, which is in turn converted into changes in the voltage by a resistance inserted in series with the light emitter. The voltage change is such that the voltage level is gradually decreased as the slits in the phase plate become closed by the rotating code wheel and gradually increased as the slits in the phase plate become aligned with the slits in the code wheel to thereby produce a quasi-sine wave with an average value of direct current level above zero. The quasi-sine wave is fed into the Schmitt trigger circuit with a threshold level in the vicinity of the above average value in order to provide a rectangular waveform output with a 50% duty cycle.

The prior opto-electric encoders, however, will suffer from variations in the output from the photodetector when subjected to variations in the power supply voltage or to raised operating temperatures so that the duty cycle of the output wave will fluctuate with said threshold level remaining unchanged, resulting in the malfunction or counting error in a controller or a counter utilizing the output of the encoder.

Following is the explanation of the above in conjunction with the attached figures.

FIG. 1 shows a light receiving section employed in a prior opto-electric rotary encoder of transmissive type. The light receiving section includes a series combination of a light emitting diode LED and a resistor R inserted between the power source $V_{cc}$ and ground, a series combination of photodiode PD and load resistance $R_{PD}$ likewise inserted between the power source $V_{CC}$ and ground, and a set of code wheel 1 and phase plate 2 positioned between the light emitting diode LED and the photodiode PD.

The connection point between the photodiode PD and the load resistance $R_{PD}$ is connected to the inverting input of an operational amplifier OP, while a threshold voltage $V_{TH}$ is applied to the noninverting input of the operational amplifier OP. The output of the operational amplifier OP is in a positive feedback connection with the noninverting input through a resistor $R_0$ so as to form the Schmitt trigger circuit.

FIGS. 2 to 5 are graphs showing the physical characteristics of the light emitting diode employed as a light emitter and the photodiode as a photodetector. The temperature vs. light intensity characteristics and the forward voltage vs. forward current characteristics of the light emitting diode are shown respectively in FIGS. 2 and 3. The temperature vs. photocurrent characteristics and the reverse voltage vs. photocurrent characteristics of the photodiode are shown respectively in FIGS. 4 and 5. As seen from these figures, when, for example, the ambient temperature is at 85°, the luminous intensity falls to 65% of what it is at 25° while the photocurrent increases to 120% of the value at 25° C., whereby total efficacy is reduced to 78% of its level at 25°.

When on the other hand the power supply voltage is raised, the current flowing through the light emitting diode LED will increase correspondingly so as to likewise increase the light intensity thereof and therefore the output of the photodetector, although the voltage appeared across the load resistance $R_{PD}$ of the photodiode remains unchanged as seen from FIG. 5. At this occurrence, however, the increasing output of the photodetector will not be in direct proportion to the increasing power supply voltage due to the nonlinear relation between the forward voltage and the forward current of the light emitting diode LED.

Thus, the prior circuit having a fixed threshold voltage $V_{TH}$ fails to compensate for the above variations in the ambient temperature as well as power supply voltage and accordingly suffers from the variations in the output duty cycle, as shown in FIGS. 6 to 8.

The above will be now explained in the following sequence. Light emitted from the light emitting diode LED upon flowing of the current therethrough will pass through the rotating code wheel 1 and the phase plate 2 to reach the photodiode PD when the slits of the both are in aligngment with one another. The photodiode PD upon receiving the light causes a current flow between the power source $V_{CC}$ and ground so as to produce a voltage across the load resistance $R_{PD}$, which voltage is then fed to the inverting input of the operational amplifier OP forming the Schmitt trigger circuit. Since the slits of one of the code wheel and the phase plate are gradually opened and then closed as the code wheel rotates, the change of the voltage fed to the operational amplifier is such that a quasi-sine wave having an average value of direct current level above zero is generated. The curves i, ii, and iii of FIG. 6 respectively show possible quasi-sing waveforms, in which the curve i in solid line is for the waveform with an average potential in normal condition, the curve ii in broken line is for the waveform with a greater average potential, and the line iii in dotted line is for the waveform with a less average potential. The quasi-sine waveform, when fed to the Schmitt trigger circuit having the fixed threshold voltage $V_{TH}$ determined by the average potential in the normal condition, provides a rectangular waveform output as shown in FIG. 7 for the condition where the average potential becomes less than that in the normal condition by being subjected to the changing ambient temperatures, and provides a rectangular waveform output as shown in FIG. 8 for the condition where the average potential becomes greater than that in the normal condition due to the raising power supply voltage, whereby an uniform duty cycle cannot be expected. The present invention has been achieved for the purpose of eliminating the above problems associated with the prior circuit and therefore providing an improved opto-electric position detector circuit.

DISCLOSURE OF THE INVENTION

The present invention discloses an opto-electric position detector including the Schmitt trigger circuit to which the output voltage of a photodetector is fed and including a voltage dividing resistor circuit from which output end a threshold voltage is input to the Schmitt trigger circuit, wherein the voltage dividing resistor circuit derives its power from the output of a load resistance network provided in association with with a light emitter. The opto-electric position detector circuit has a basic configuration that the voltage dividing resistor circuit is in a series-parallel arrangement with a series combination of resistor and thermistor having a negative temperature coefficient of resistivity which combination is in parallel relation with another resistor in order to derive its power from the output of the load resistor network associated with the light emitter. Light from the light emitter is received at the photodetector which in response thereto provides an output voltage. The output voltage is compared with the threshold voltage at the Schmitt trigger circuit so as to provide a rectangular waveform output therefrom.

The output voltage from the photodetector will vary depending upon the temperature characteristic of the photodetector, i.e., it will decrease with the increasing ambient temperature. Also, the threshold voltage of the Schmitt trigger circuit will vary with the ambient temperature as it is derived from the voltage dividing resistor circuit including the thermistor having negative temperature coefficient of resistivity, i.e, the resistance of the thermistor will decrease with an increase in ambient temperature to vary the dividing ratio of the voltage dividing resistor circuit, thereby causing the decrease in the threshold voltage. Consequently, temperature compensation for output voltage from the photodetector can be effected by suitably choosing a circuit constant of the voltage dividing resistor circuit including the thermistor in consideration of the temperature characteristic of the photodetector.

While on the other hand, variations in the power supply voltage will give rise to variations in the current flowing through the light emitter so as to correspondingly change the amount of light emitted from the light emitter, thus causing the output voltage of the photodetector to change. The variations in the current flowing through the light emitter cause the voltage appeared across the load resistance to proportionally change, thus resulting in the corresponding changes in the threshold voltage of the Schmitt trigger circuit which is obtained from the voltage dividing resistor circuit connected to the output of the load resistance network. It is noted at this time that since the amount of light emitted from the light emitter varies in direct proportion with the amount of current flowing therethrough the output voltage of the photodetector is in direct proportional relation with the threshold voltage, assuring the Schmitt trigger circuit to provide a consistent rectangular waveform output regardless of the variations in the source of voltage. Since the present invention adopts the configuration that the voltage dividing resistor circuit is designed to be in the form of a series-parallel arrangement with a series combination of resistor and thermistor having negative temperature coefficient of resistivity which combination is in parallel relation with another resistor, as described hereinbefore, the Schmitt trigger circuit can provide a consistent rectangular waveform output over a wide temperature range, assuring exact control and measurements even in actual operating locations suffering from severe environmental conditions where temperatures are high. Further, with the configuration of the voltage dividing resistor circuit deriving its power from the output of the load resistance network associated with the light emitter it is possible to compensate both for temperature and power supply voltage variations by a single circuit arrangement, whereby providing a consistent rectangular waveform output from the Schmitt trigger circuit over a wide range of power supply voltage regardless of the possible variations in the power supply voltage which affect the threshold voltage of the Schmitt trigger circuit.

Another advantageous feature disclosed in the present invention is to assure the temperature compensation over a wide range. For the purpose of attaining this effect, there is disclosed a circuit geometry in which the output voltage at an ambient temperature of +85° C. of the voltage dividing resistor circuit including the resistors and the thermistor is set to be approximately 80% of the output voltage at an ambient temperature of +25° C. By adopting this circuit geometry it is possible for the circuit utilizing the light emitting diode as a light emitter and the photodiode as a photodetector to provide temperature compensation with regard to the threshold voltage against the variations in the output voltage of the photodetector even when the ambient temperature rises from 25° C. to 85° C.

BEST MODE FOR CARRYING OUT THE INVENTION

Figure 9:
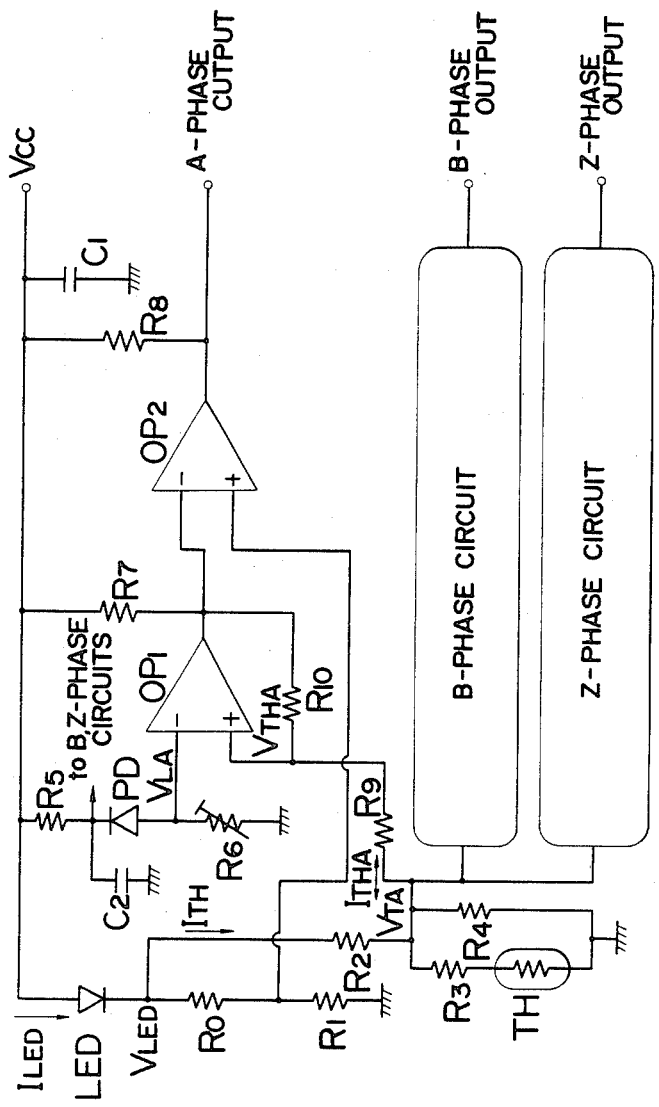
FIG. 9 is a circuit diagram of an opto-electric position detector circuit in accordance with an embodiment of the present invention.

The present invention will be discussed in more detail with reference to the attached drawings. As shown in FIG. 9, the opto-electric position detector circuit includes a series combination of a light emitting diode LED and load resistances $R_0$, $R_1$ which combination is inserted between a power source $V_{CC}$ and ground such that the light emitting diode LED will give off light upon receiving a current $I_{LED}$ from the power source $V_{CC}$. Also inserted between the power source $V_{CC}$ and ground is a series combination of resistor $R_5$, photodiode PD and variable load resistance $R_6$ so that the photodiode PD, upon receiving the light from the light emitting diode LED, flows a current to thereby produce a voltage $V_{LA}$ at the point between the photodiode PD and the variable load resistance $R_6$. The output end producing the voltage $V_{LA}$ is connected to the inverting input of an operational amplifier $OP_1$ forming the Schmitt trigger circuit. Another operational amplifier $OP_2$ is included for amplifying the output from the operational amplifier $OP_1$. Resistors $R_7$ and $R_8$ are load resistances respectively for the operational amplifiers $OP_1$ and $OP_2$ with open-collector gate. Capacitors $C_1$ and $C_2$ are employed for a noise reducing purpose.

When the light from the light emitting diode LED is received by the photodiode PD, it flows the current therethrough to produce between the photodiode PD and the resistor $R_6$ the output voltage $V_{LA}$ of the photodetector, which is input to the Schmitt trigger circuit formed by the operational amplifier $OP_1$ where it is compared with the threshold voltage $V_{TH}$ to provide a rectangular waveform output to be finally amplified by the operational amplifier $OP_2$.

Considering that the above detection circuit can deal only with the signal in one of phasor quantities obtained by the combination of the phase plate and the code wheel and that the position detection is effected by the signal in one phase, for example, termed as A-phase, it is necessary to add other separate detection circuits, i.e., B-phase and Z-phase circuits of the like configuration as the A-phase circuit for the purpose of processing signals representative of the direction and the speed of rotation. The individual threshold voltages $V_{TH}$ in the B-phase and Z-phase circuits are obtained from the same point as in the A-phase circuit.

The circuit operation will be discussed in the following. When the ambient temperature is raised from 25° C. to 85° C., the threshold voltage $V_{THA}$ with which the output voltage $V_{LA}$ of the photodetector is compared will vary in a corresponding manner with the output voltage $V_{LA}$ as it is derived through a resistor $R_9$ from a temperature compensation circuit composed of resistors $R_2$, $R_3$, $R_4$ and thermistor TH of negative temperature coefficient of resistivity.

That is, the thermistor TH will reduce its resistance with an increase in temperature, the resistance $R_{TH}$ being expressed by the following equation:

$$R_{TH} = R_0 \exp[B \times (1/T - 1/T_0)]$$

where $R_0$ is the resistance at a temperature of 25° C. and the B is the temperature coefficient. However, as it is not actually possible to determine a given resistance as well as temperature coefficient with a single thermistor, the resistors $R_2$, $R_3$ and $R_4$ are combined therewith to provide the temperature compensation circuit of the present invention.

When current $I_{TH}$ flowing in the temperature compensation circuit is estimated to be 1 mA in consideration of the amount of heat dissipated from the thermistor TH, the required resistance of resistor $R_2$ is determined by the following equation:

$$R_2 = (V_{LED} - V_{TH25}) \times 10^{-3}$$

where $V_{TH25}$ is the threshold voltage at a temperature of 25° C. Hereinafter, postscripts 25 and 85 added to various symbols are used for indicating the quantities at respective temperatures of 25° C. and 85° C. The respective threshold voltages at 25° C. and 85° C. are determined by the following equation forms:

$$V_{TH25} = V_{LED} \times RR_{25}/(R_2 + RR_{25}), \text{ and}$$

$$V_{TH85} = V_{LED} \times RR_{85}/(R_2 + RR_{85})$$

where $RR = (R_3 + R_{TH}) \times R_4/(R_3 + R_{TH} + R_4)$. Since the $V_{TH85}$ is known to be 0.78 times the $V_{TH25}$, the combination of the above equations gives the values for $RR_{25}$ and $RR_{85}$. Also, since it can be expressed that $R_{TH25} = R_0$ and $R_{TH85} = R_0 \exp[B \times (1/358 - 1/298)]$, the solution of the quadratic equations in $R_3$ and $R_4$ can give the values therefor. With the values thus determined for $R_2$, $R_3$ and $R_4$, the threshold voltage $V_{TH}$ can be lowered in proportion to the lowering photodetector output level which results from the raising ambient temperature, thus enabling the output to be maintained at a constant duty cycle (normally at a duty cycle of 50%). A resistor $R_{10}$ is employed for a feedback purpose of providing hysteresis characteristic to the operation of the operational amplifier and a resistor $R_9$ for a connection purpose. Because of these resistors $R_9$ and $R_{10}$, the current $I_{THA}$ flowing in and out the temperature compensation circuit is set to be sufficiently smaller than the current $I_{TH}$.

Figure 1:
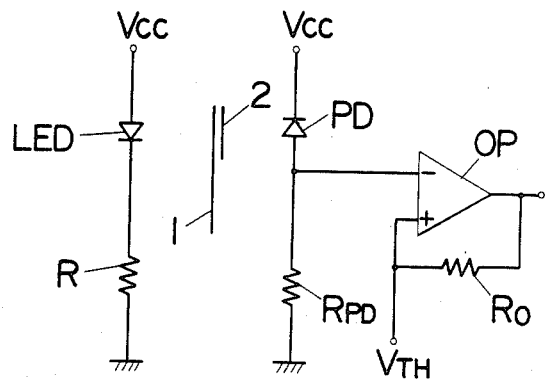
FIG. 1 is a schematic view of the light receiving section of a prior encoder.
Figure 2:
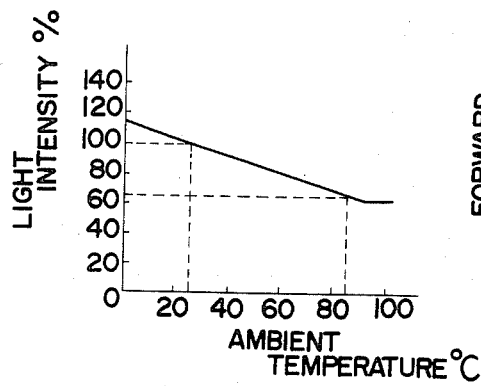
FIGS. 2 to 8 are graphs respectively explaining the present invention.
Figure 3:
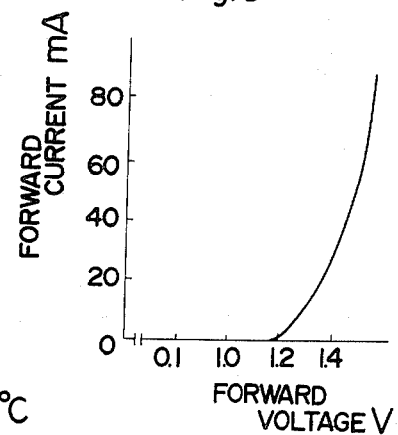
Figure 4:
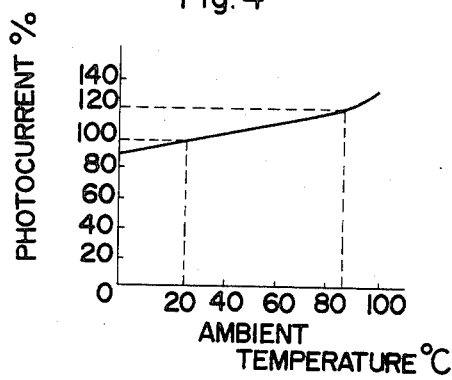
Figure 5:
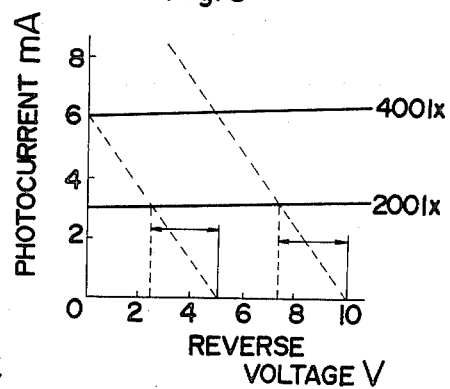
Figure 6:
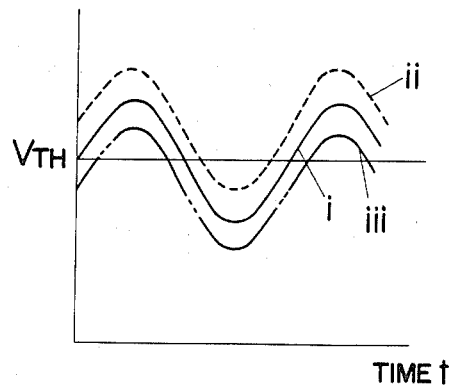
Figure 7:
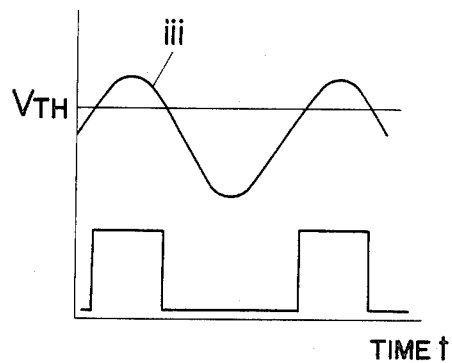
Figure 8:
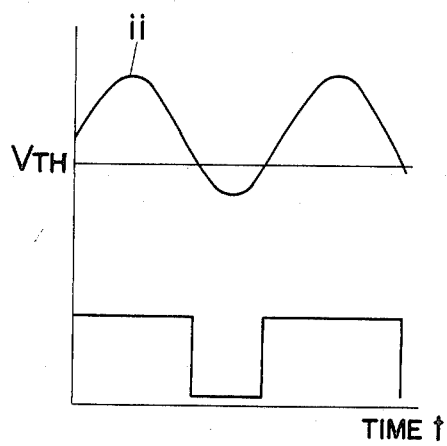

Since the threshold voltages $V_{THA}$, $V_{THB}$ and $V_{THC}$ in the respective phase circuits are fed from the voltage dividing resistor circuit including the thermistor TH, they are naturally in direct proportion to the output voltage $V_{LED}$ of the light emitting diode LED. Considering that the light emitting diode LED carries a current of several tens of mA such that the current $I_{TH}$ flowing in the operational amplifier $OP_1$ can be neglected, the output voltage $V_{LED}$, which is produced by the load resistances $R_0$ and $R_1$ in association with the light emitting diode LED, is set to be in direct proportion to the current $I_{LED}$ flowing through the light emitting diode LED. While on the other hand, as the output of the photodetector is in directly proportional relation with the current $I_{LED}$, the output voltage $V_{LA}$ of the photodetector is naturally in direct proportion to the threshold voltage $V_{TH}$, thus enabling the compensation for the voltage variations. Additionally speaking, if the output voltage $V_{LED}$ should be connected directly to the power supply voltage, the voltage compensation could not be attained because of the non-linear relationship between the forward current and forward voltage characteristics, as shown in FIG. 3.

I claim:

1. A temperature compensated electro-optical light transmission circuit for use in detecting the motion of a moving object, comprising:
   a light emitting diode connected in series with a first resistor across a voltage source, said light emitting diode emitting light which varies in intensity in a monotonic decreasing relationship with an increasing ambient temperature over a temperature range from a low temperature point to a high temperature point;

a photodiode connected in series with a load resistor across the voltage source and cooperating with said light emitting diode to define an optical path in which a moving object is positioned to intermittently break the light transmitted from the light emitting diode to the photodiode as said object moves for detection of the motion thereof, said photodiode having the inherent characteristic of producing an output voltage which varies in a monotonic increasing relationship with the increasing ambient temperature over the same temperature range upon receipt of light of a constant level so that said photodiode responds to receiving the light from said light emitting diode for producing an output voltage which varies in a linear relationship with the increasing ambient temperature over the same temperature range, said linear relationship reflecting the variations in the outputs of the light emitting diode and the photodiode with the varying ambient temperature;

an operational amplifier having its inverting input connected to the photodiode for receiving the output therefrom, and said operational amplifier having its non-inverting input connected through a feedback resistor to its output end so as to form a Schmitt trigger circuit;

a temperature compensating network connected across said first resistor, said temperature compensating network being in the form of a series-parallel resistor circuit comprising a series combination of a second resistor, a third resistor and a thermistor having a negative coefficient of resistivity, and a fourth resistor connected across said third resistor and said thermistor in parallel relationship therewith, the connection point between the second resistor and the third resistor being connected to the non-inverting input of the Schmitt trigger circuit so as to apply thereto the output voltage developed across the third resistor and thermistor combination as a reference voltage defining a threshold voltage for comparison with the output voltage of the photodiode indicative of the intensity of the light received; and said temperature compensating network having values of said second, third and fourth resistors determined in conformity with the value of the thermistor, such that said threshold voltage varies in a linear proportional relationship with the increasing ambient temperature over the same temperature range for counterbalancing said linear relationship between the output voltage of the photodiode receiving light from the light emitting diode and the varying ambient temperature, thereby producing a correspondingly varying threshold voltage to compensate for both the variations in the outputs of the light emitting diode as well as the photodiode over said temperature range.

2. The temperature compensated electro-optical light transmission circuit of claim 1, wherein said low temperature point is 25° C. and the high temperature point is 85° C. so that the temperature compensating network produces said threshold voltage which varies in linear relationship with the increasing ambient temperature over the temperature range from 25° C. to 85° C. for compensation of the variances of the light emitting diode and the photodiode in said temperature range.

* * * * *